United States Patent [19]

Shaklee et al.

[11] Patent Number: 5,077,502
[45] Date of Patent: Dec. 31, 1991

[54] COMPENSATION FOR DRIFT IN A CATHODE RAY TUBE

[75] Inventors: Kerry L. Shaklee, Brighton; Thomas A. Sturm; John C. Wittenberger, both of Littleton, all of Colo.

[73] Assignee: Honeywell Inc., Minneapolis, Minn.

[21] Appl. No.: 515,062

[22] Filed: Apr. 26, 1990

[51] Int. Cl.$^5$ ............................................. H01J 29/52
[52] U.S. Cl. ..................................... 315/383; 315/381
[58] Field of Search ........................ 315/383, 10, 381; 358/168

[56] References Cited

U.S. PATENT DOCUMENTS

| | | | |
|---|---|---|---|
| 4,070,691 | 1/1978 | Smith et al. | 358/29 |
| 4,075,485 | 2/1978 | Lijewaki et al. | 298/369 |
| 4,187,451 | 2/1980 | Boekhorst | 315/381 |
| 4,300,074 | 10/1981 | Diddens et al. | 315/401 |
| 4,442,458 | 4/1984 | Barter | 358/243 |
| 4,449,501 | 2/1985 | Eriksen et al. | 358/302 |
| 4,461,983 | 7/1984 | Lees | 315/383 |
| 4,701,679 | 10/1987 | Satou et al. | 315/383 |
| 4,724,364 | 2/1988 | Newton | 315/383 |
| 4,742,397 | 5/1988 | Ferla et al. | 315/10 |

Primary Examiner—Theodore M. Blum
Attorney, Agent, or Firm—Kinney & Lange

[57] ABSTRACT

A circuit which compensates for the effects of drift that occur during the operation of a cathode ray tube because of temperature changes or aging and which produces changes in intensity of the picture on the cathode ray tube by sensing the intensity changes and varying the bias on the second grid of the cathode ray tube to restore the desired intensity.

40 Claims, 4 Drawing Sheets

COMPENSATION FOR DRIFT IN A CATHODE RAY TUBE

BACKGROUND OF THE INVENTION

The present invention relates to a method and apparatus for correcting problems associated with drift occurring in a cathode ray tube (CRT) and, more particularly, to prevent changes of intensity due to factors such as aging and temperature variations so as to permit accurate and consistently excellent quality from high resolution color hard copy printers which utilize CRT's as an image source.

It has long been known that changes in temperature which naturally occur in a CRT during use can cause dimensional changes between its electrodes and thus change the intensity or brightness of the image on the CRT face. Similar effects can occur as the CRT age due to phosphors deteriorating and reductions in cathode emission. The change in intensity from these effects is sometimes referred to as drift and, for normal television viewing, are generally unnoticed by a viewer.

In some applications, however, it is necessary for the intensity of radiation on the face of the cathode ray tube to remain constant for a given input and effects of drift have heretofore been objectionable. For example, in the art of graphic recording, a light sensitive paper is caused to move across the face of a cathode ray tube to provide a permanent record of the image produced by the CRT. Most writing media such as dry silver paper are quite sensitive to light intensity and, particularly when writing low density colors, the effects of drift are quite noticeable. Accordingly, it is desirable to eliminate the effects of drift in such systems so to assure consistently high quality reproductions.

Attempts to control the intensity of illumination on the face of the CRT have been made in the past by measuring the brightness of the CRT face and changing the bias of the cathode in such a way that the brightness remains constant. Unfortunately, adjusting the cathode bias undesirably causes the grid modulation gain to change.

SUMMARY OF THE INVENTION

The present invention overcomes the problem of drift by measuring the current to the cathode, which is proportional to the brightness of the image on the CRT, and determining whether the current has changed from a reference value. If it has, a feedback signal to the second grid of the CRT, is provided so as to change the current back to the reference value without changing the grid modulation gain. After such calibration has been performed, the CRT is used to create the image desired for recording purposes. It is preferable to perform the calibration frequently, as for example prior to each recording, and at a point, for example, just above the cut-off of the cathode. Accordingly, prior to each exposure of the recording paper, the current to the cathode is measured at this slightly above cutoff point and, if it has changed from the reference value, the potential of the second grid of the CRT is changed by an amount sufficient to restore the cathode current and thus assure consistent image brightness.

DETAILED DESCRIPTION OF THE PREFERRED EMBODIMENTS

Figure 1:
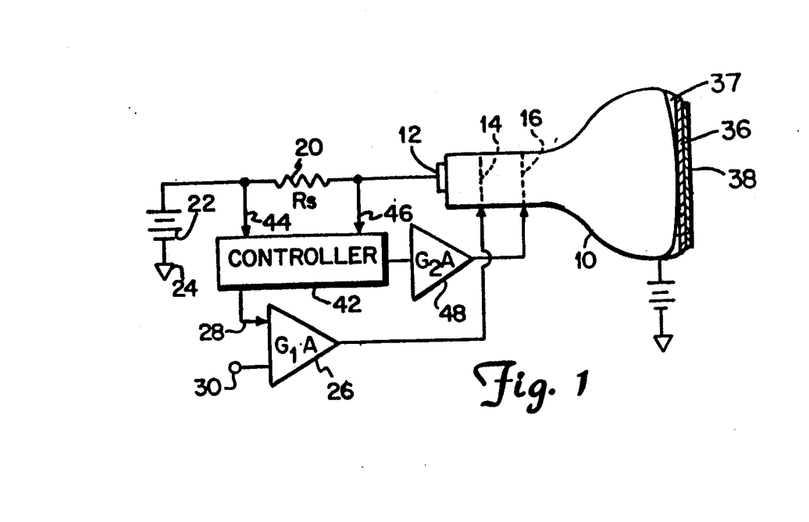
FIG. 1 is a schematic representation of the compensation concept of the present invention.

In FIG. 1, a cathode ray tube 10 is shown having a cathode 12, a first grid, $G_1$, identified by reference numeral 14 and a second grid, $G_2$, identified by reference numeral 16. Cathode 12 is shown connected through a resistor 20, identified as the sensing resistor $R_S$, to a source of fixed potential which is shown for convenience as a battery 22 whose other side is connected to ground at 24. In actual practice, as will be described below, the supply voltage for cathode 12 is produced by and amplifier controlled by a computer and control register.

Connected to the first grid 14 is a $G_1$ amplifier 26 having a first input 28 and a second input connected to a pixel input terminal 30. As is common in CRT operation, the pixel input 30 provides a signal which is amplified by pixel amplifier 26 to drive the first grid 14 and thus vary the intensity of the electron beam emanating from cathode 12. This electron beam passes the second grid 16 and strikes the phosphors which are on the inside surface of a fiber optic member 36, which is part of CRT 10, and which causes the phosphors to glow in a desired fashion. FIG. 1 also shows a glass face 37 bonded to the front of CRT 10 to provide the flat surface for a fiber optic member 36. Fiber optic member 36 may comprise a compact array perhaps eight inches by ⅛ inch with several million individual fibers which are used to conduct the light from the CRT to a moving paper or film 38 which is movable into and out of a plane of FIG. 1. Film 38 receives the image as produced by the fiber optic member 36 and causes an image to be created thereon which is developed to produce the desired picture. A CRT with Fiber optic front face is obtainable from Honeywell as part number 16822770, made by Thomas Electronics. A system for such a recording is found in U.S. Pat. Nos. 4,309,720 and 4,499,501, issued Jan. 5, 1982 and Feb. 12, 1985 respectively.

The intensity of the illumination from the face of CRT 10 is directly proportional to the current from the cathode 12, primarily controlled by the voltage on grid 14. Grid 16, which is normally biased at a fixed potential, can also have an effect on the intensity by changing the bias potential thereto. In order to maintain the intensity for a given input at a fixed or constant value, a controller 42 having a first output connected to the first input 28 of amplifier 26 and which will be described hereinafter, has first and second inputs connected on either side of the sensing resistor 20 by conductors 44 and 46. It is seen that as the current through the cathode 12 changes, so will the voltage across resistor 20 and thus the input to controller 42. A second output of controller 42 is shown connected through a G₂ amplifier 48 to the second grid 16. Therefore, the voltage on grid 16 will be controlled by the output of amplifier 48 which is dependent upon the magnitude of the current in resistor 20 and thus upon the intensity of the beam in cathode ray tube 10.

In order to assure that a predetermined intensity is maintained, even though the cathode ray tube may change temperature or age and thus cause drift, the desired intensity is first measured when the input 30 is at a predetermined value. Thereafter, when the current in resistor 20 changes due to drift, the output of controller 42 and amplifier 48 will change in such a way that the potential on grid 16 will bring the current in resistor 20 back to its calibration value. It should be noted that while resistor 20 is shown between cathode 12 and potential source 22, it could as readily be placed between potential source 22 and ground 24. As long as it has the cathode current flowing therethrough, the voltage thereacross can be used to measure cathode current and thus image brightness. Also, as will be explained in connection with FIGS. 7 and 8, anode current or direct brightness measurement can be used in place of cathode current for calibration control.

Figure 2:
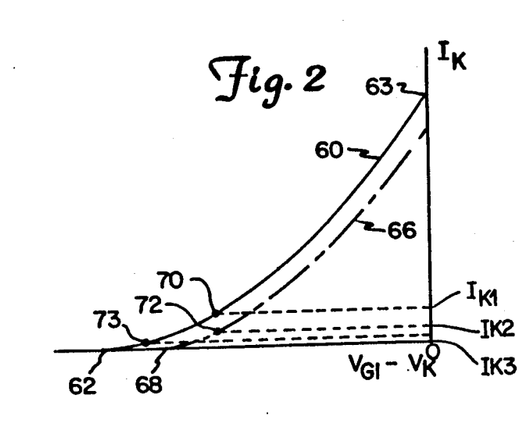
FIG. 2 is a graph showing the variation of cathode current with variation of cathode-grid bias.

FIG. 2 shows the variation of cathode current with variations in the cathode and first grid bias. In FIG. 2, a first and solid line operating curve 60 is shown extending from a negative point 62 on the horizontal axis along curve 60 upwards to the right to the zero axis at point 63. Point 62 is that point where current in the cathode first begins flowing and is referred to as the "cutoff" point. It would seem that as long as $V_{g1}-V_k$ remained constant, the current $I_k$ and thus brightness of the image produced by the CRT would remain constant. However, due to factors such as aging and temperature variations which can cause displacement of the electrodes or deteriorate of the elements, the current $I_K$ may change even though $V_{G1}$ and $V_K$ remain constant. This change is referred to as "drift" and an example of the effect of drift is shown in FIG. 2 by the dash-dot curve 66. It is seen that curve 66 has moved to the right in FIG. 2 so that the cutoff point 62 has now moved to a point 68. Curve 66 is seen to be substantially the same shape as curve 60 but for any given value of $V_{g1}-V_k$ the value of $I_k$ and thus the brightness of the image is reduced. With curve 60 moved to the right to curve 66, it is seen that the cathode current and thus the brightness has changed. For example, a point 70 on curve 60, somewhat above the cutoff point 62, is shown corresponding to a cathode current $I_{K1}$ and thus to some low level brightness on the face of CRT 10. After drift, however, point 70 would now be at a point 72 on curve 66. Point 72 is seen to occur at a cathode current of $I_{K2}$ and thus corresponds to a significantly lower brightness of the face of CRT 10. This effect will produce different images on the film 38 and is quite undesirable.

The problem is overcome if the bias on $V_{G2}$ is increased from its previous value to a new value which moves curve 66 to the left so as to again fall along curve 60. As will be explained in connection with FIGS. 3 through 5, this is accomplished by periodically checking the cathode current $I_{K3}$ at a predetermined point such as a point 73 on curve 60 which is just above cutoff. If this current has changed, the system will automatically operate to change $V_{G2}$ appropriately. Since variations in intensity are most noticeable at low brightness, it is desirable to calibrate the system at a fairly low point on curve 60, just above cutoff but not too close to cutoff since the current is difficult to measure at extremely low values. The fact that the curve 60 does not appreciably change shape when changing the bias on $G_2$, is an advantage obtained from the present invention when compared to controlling the bias on either the cathode or $G_1$. If, either the cathode or $G_1$ were controlled, the shape of curve 60 would not remain substantially the same and when trying to correct for drift, the previous operating curve would not be reestablished. Thus the characteristics of the output image would be somewhat different after drift correction.

Figure 3:
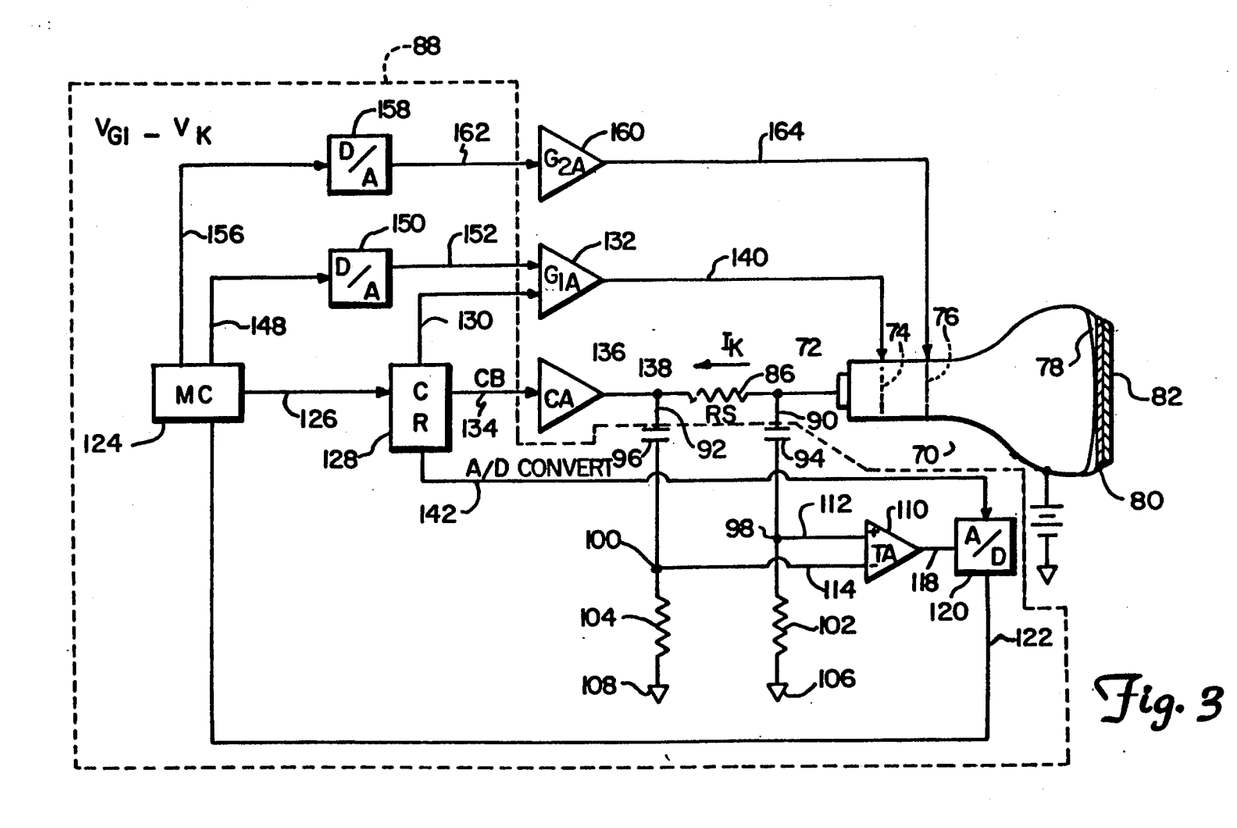
FIG. 3 is a schematic diagram of a preferred embodiment of the present invention.

In FIG. 3, a CRT 70 having a cathode 72, a first grid 74, a second grid 76 and a face 78 is shown with a fiber optic end 80 to produce an image on a suitable paper or film 82 as was described in connection with FIG. 1. A sensing resistor $R_S$, identified by reference numeral 86, is used to sense the cathode current $I_K$. A controller 88, shown in dashed lines, is connected to both sides of resistor 86 by leads 90 and 92 which are shown connected to capacitors 94 and 96 which are, in turn, connected to terminals 98 and 100. Terminals 98 and 100 are connected through resistors 102 and 104 to ground at 106 and 108, respectively, and also to the plus and minus inputs, respectively, of an instrumentation amplifier 110 by conductors 112 and 114. In a manner to be described below, during calibration the voltage on the grid $G_1$ is modulated by alternately blanking and unblanking so as to produce an alternating component to the current through resistor 86. The reason for this is that the voltage difference across resistor 86 is quite small, particularly at the low current levels preferred for calibration, in comparison to the relatively high bias voltage on the cathode. By modulating the DC voltage and using capacitors 94 and 96, only the alternating voltage passes to the instrumentation amplifier 110 and detection of changes is easier. Further A.C. coupling eliminates the effect of any cathode leakage current.

Instrumentation amplifier 110 produces an output on a conductor 118 which is of a magnitude corresponding to the difference in magnitude between its plus and minus inputs and thus to the current $I_K$. The signal on line 118 is presented to an analog-to-digital converter 120 to produce an output, on digital lines 122 which alternates between of two digital words. The first word is indicative of the voltage across resistor 86 when $G_1$ is unblanked and second word is indicative of the voltage across resistor 86 when $G_1$ is blanked. Thus a digital peak-to-peak output is obtained. These digital signals are presented to a Micro Computer 124, identified as MC, for processing as will be described below.

MC 124 also determines the voltages to be applied to the cathode, $G_1$ and $G_2$. A first output from MC 124 appears on digital lines 126 to a control register 128 which operates during calibration to produce the above mentioned blanking and unblanking signals on line 130 to $G_1$ amplifier 132 for modulating the bias on grid 74 and thus the current in the resistor 86 as described above. Blanking and unblanking signals to $G_1$ are also supplied from MC during image writing but not at the same periodicity. During the writing of a line, $G_1$ receives an unblank signal and when the beam moves from the end of one line to the beginning of the next, $G_1$ receives a blanking signal. Control register 128 also provides an output on a line 134 to a cathode amplifier 136 to bias cathode 72 and to provide a blanking signal thereto when the system is not writing images. This prevents the slow build up of noise on the sensitive paper if it is left adjacent to the CRT at non-operating times. The output of cathode amplifier 136 is connected by a line 138 through resistor 86 to cathode 72 while the output of amplifier 132 is connected to the first grid 74 by a line 140. A third output from control register 128 is presented by line 142 to the analog-to-digital converter 120 so as to supply a synchronizing "convert" signal thereto which enables A/D 120 to digitize the output of instrumentation amplifier 110 in synchronism with the $G_1$ blanking signal. In this connection, it is preferable to delay the digitization of the output from instrumentation amplifier 110 toward the end of the blanked and unblanked signals so that any transients in the signal through capacitors 94 and 96 have died out.

A second output from MC 124 is the pixel signal on digital lines 148 which is presented to a digital-to-analog converter 150 for change to an analog signal for presentation to amplifier 132 over a line 152. Amplifier 132 adds the pixel signal on line 152 to the unblanking signal on line 130 during writing. The pixel signal is normally zero during calibration.

A third output from MC 124 is presented on digital lines 156 to a digital-to-analog converter 158 which changes the digital signal to an analog signal and supplies this to an amplifier 160 over a line 162. Amplifier 160 amplifies the signal and supplies the proper bias signal to $G_2$ over a line 164.

The operation of FIG. 3 is as follows: at the beginning of a print cycle but before this actually starts, a signal from MC 124 provides a predetermined bias signal over line 156, through D/A 158, amplifier 160 to $G_2$. While, as will be further explained below, the magnitude of this signal may be that which existed for $G_2$ at the end of the last recent cycle, we prefer to reduce it below that value and in fact we find it convenient to bias $G_2$ so as to move curve 66 in FIG. 2 to the far right. For calibration, the pixel signal over line 148 is made zero and a cathode unblank signal over digital lines 126 through control register 128 is presented to amplifier 136. The magnitude of the biasing signals from amplifiers 132 and 136 are set for calibration to be such that $V_{G1} - V_k$, in FIG. 2 varies With voltage applied to $G_1$ from the unblanked state just above cutoff (e.g. point 73) to the blanked state far to the left of point 62 (cutoff). It should be understood that for clarity, FIG. 2 has been greatly exaggerated and point 73 is really very close to point 62. In actual practice, if the cathode voltage were say 60 volts and $V_{G1}$ varied from 5 to 15 volts, point 73 would be at minus 45 volts. Then as $G_1$ is blanked and unblanked, the value of $V_{G1} - V_K$ would vary from minus 45 volts through cutoff at about minus 45.1 volts to minus 55 volts and back periodically. It is necessary that, during calibration, there be no current flow in the cathode during the blanked portion of the alternating cycle and it is seen that this is assured in the situation above where the blanking signal places the $V_{G1} - V_K$ voltage far to the left in FIG. 2 and the system is operating along curve 60. It is also seen that calibration could occur on other parts of curve 60 in FIG. 2 so long as the condition of there being no cathode current during blanking is satisfied. For example, if $G_2$ voltage is such that the system is operating along curve 60 in FIG. 2, calibration can be performed at any point along curve 60 so long as the blanking signal causes $V_{G1} - V_K$ to fall at point 62 (cutoff) or below. Generally, when calibration is performed between two adjacent image productions (or during an image production) a voltage on $G_2$ equal to its last known value is satisfactory to be used for the start of calibration since the components and the values will not have changed very much. However, after the system has been shut down, it is not safe to start up with the voltage on $G_2$ at its last value, since the components, i.e. the CRT, may have been changed in the interim. The new CRT may have much different operating points and the previous $V_{G2}$ might be too large. Therefore, for the initial calibration after shut down, the voltage on $G_2$ is set to a lower value so that the curve in FIG. 2 moves far to the right thus assuring no current flow. Then, to continue calibration, the current in resistor 86, which will be zero at first, is sensed to produce a signal on lines 122 to MC 124 where it is compared with a reference signal. As long as the reference signal is the larger, the signal on lines 156 will increase to increase the bias on $G_2$, which has the effect of moving the curve in FIG. 2 back toward the left. This continues until current starts flowing in the cathode and until the peak to peak current sensed in resistor 86 arrives within a predetermined window close to the desired value, for example $I_{k3}$ in FIG. 2 where the calibration process can be stopped. Note that because the points 73 and 62 are so close together, the peak to peak value is really some value minus zero (except for a small leakage current) thereby simplifying the measurement. At the time the cathode current reaches the window around point 73, the pixel signal on lines 148 is resumed and the CRT proceeds to produce the image for copying on the paper 82 knowing that the brightness is correct. As mentioned above, when calibrating shortly after a previous image production it would not be necessary to reduce the voltage on $G_2$ but, in order to avoid having to have two algorithms for calibration start, is convenient to continue to reduce the $G_2$ voltage as above for each calibration. It should be understood that while we prefer to calibrate the system at the low end near cutoff so that the changes due to drift are the most noticeable, we do not intend that the invention be thus limited since, as explained above, calibration can be done at other points above cutoff.

Figure 4:
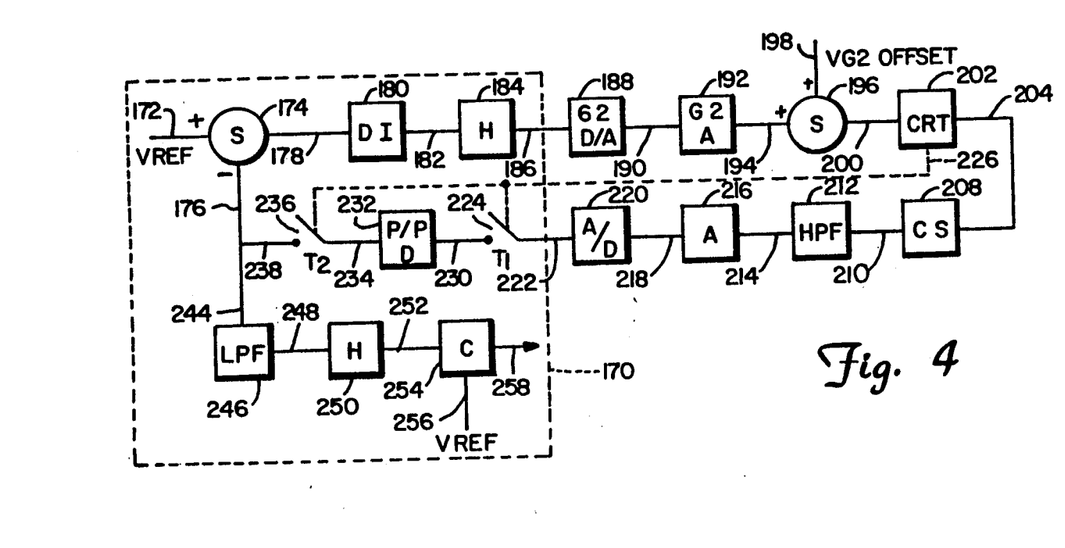
FIG. 4 is a block diagram of the control hardware and software of the present invention.

FIG. 4 shows a block diagram of the functional operation of the present invention. In FIG. 4, dashed line 170 represents software portions of the invention and shows functions which are performed by the MC 124 of FIG. 3 and the remaining blocks in FIG. 4 represent hardware portions of the invention. A reference voltage "$V_{REF}$" is shown in FIG. 4 at the left on a line 172 as a positive voltage, which is in digital form, applied to one input of a summing circuit 174. A second input to summing circuit 174, also in digital form, is shown as a negative voltage on a line 176. The sum (the difference of absolute magnitudes) of the voltages on lines 172 and 176, is presented on a line 178 to a digital integrator Digital integrator 180 integrates the signal on line 178 and operates to slow the process down and improve calibration accuracy, as will be explained. The output of integrator 180 on a line 182 is presented to a hold circuit 184 where the value of the signal on line 182 is held until the next update and applied to grid 74 in FIG. 3. A new update occurs towards the end of a blank or an unblank period.

The signal stored in hold circuit 184 is presented on line 186 to a digital-to-analog circuit 188 for the second grid which may be the same as D/A 158 in FIG. 3. The signal is converted to an analog signal and presented on a line 190 to an amplifier 192 which amplifies the signal and presents it on a line 194 as one input to a summing circuit 196. Summing circuit 196 has a $V_{G2}$ offset input on a line 198 which is a signal of magnitude set for the minimum bias on $G_2$. The signals on lines 194 and 198 are summed by circuit 196 and the result is used to bias the second grid on the CRT. This is shown in FIG. 4 as the signal on line 200 to CRT 202. The current in the cathode of CRT 202 is presented on an output line 204 in FIG. 4 and the magnitude of this current is sensed by a current sensor 208. The current signal from sensor 208 is passed by a line 210 through a high pass filter 212 and a line 214 to an amplifier 216. The amplified signal is then presented by a line 218 to an analog-to-digital converter 220 to provide a digital output signal on a line 222 representative of the magnitude of current in the cathode of CRT 202. The current sensor 208, high pass filter 212, amplifier 216 and A/D 220 may be the same as the resistor 86, capacitors 94 and 96, instrumentation amplifier 110 and A/D 120 of FIG. 3.

The digital signal indicative of the cathode current on line 222 is processed in the MC by sampling the signal at predetermined times, i.e. near the ends of the blanking and unblanking signals which are presented to the first grid 74 in FIG. 3. This is represented in the software operation by a switch 224 identified as $T_1$ and connected to the CRT 202 by a dashed line connection 226 which shows that the switch 224 is synchronized with the signals to the CRT 202. The result of the sampling is to provide two digital signals on a line 230, one representative of the current when the first grid is blanked and the other representative of the current when the first grid is unblanked. The difference between these two signals is the peak-to-peak current, the function of which is shown in FIG. 4 by the peak-to-peak detector 232 connected to line 230. The peak-to-peak signal from detector 232 is presented on a line 234 to another switch 236, identified by $T_2$ to show that periodically, preferably after every blank-unblank cycle, the peak-to-peak signal is presented by a line 238 to the summing circuit 174 to be compared with $V_{REF}$ on line 172. Whenever this digital signal on line 176 is different than the digital signal on line 172, the summing circuit 174 will produce an output to the integrator 180 which is an error signal representing the difference between $V_{REF}$ and the peak-to-peak signal on lines 176 and the above cycle repeats to again adjust the voltage to the second grid of CRT 202. The integrator will force $V_{G2}$ to whatever bias is necessary to force the error signal to nearly zero resulting in a very accurate compensator. When, finally, the bias on the second grid is proper, the voltages on lines 176 and 172 will be equal and the rebalance is complete. To end the calibration at this time, the peak-to-peak signal on line 176 is presented over a line 244 to a digital low pass filter 246 and by a line 248 to a hold circuit 250. The digital signal in hold circuit 250 is indicative of the filtered peak-to-peak voltage on line 176. This signal is presented by a line 252 to a comparator 254 which also receives the $V_{REF}$ signal over a line 256. Comparator 256 determines whether or not the peak-to-peak signal is within a certain window or percentage of being the same as the $V_{REF}$ signal and, if so, produces an output signal on a line 258 which may be used by the system to stop the compensation cycle and start the image making and copying process.

Figure 5:
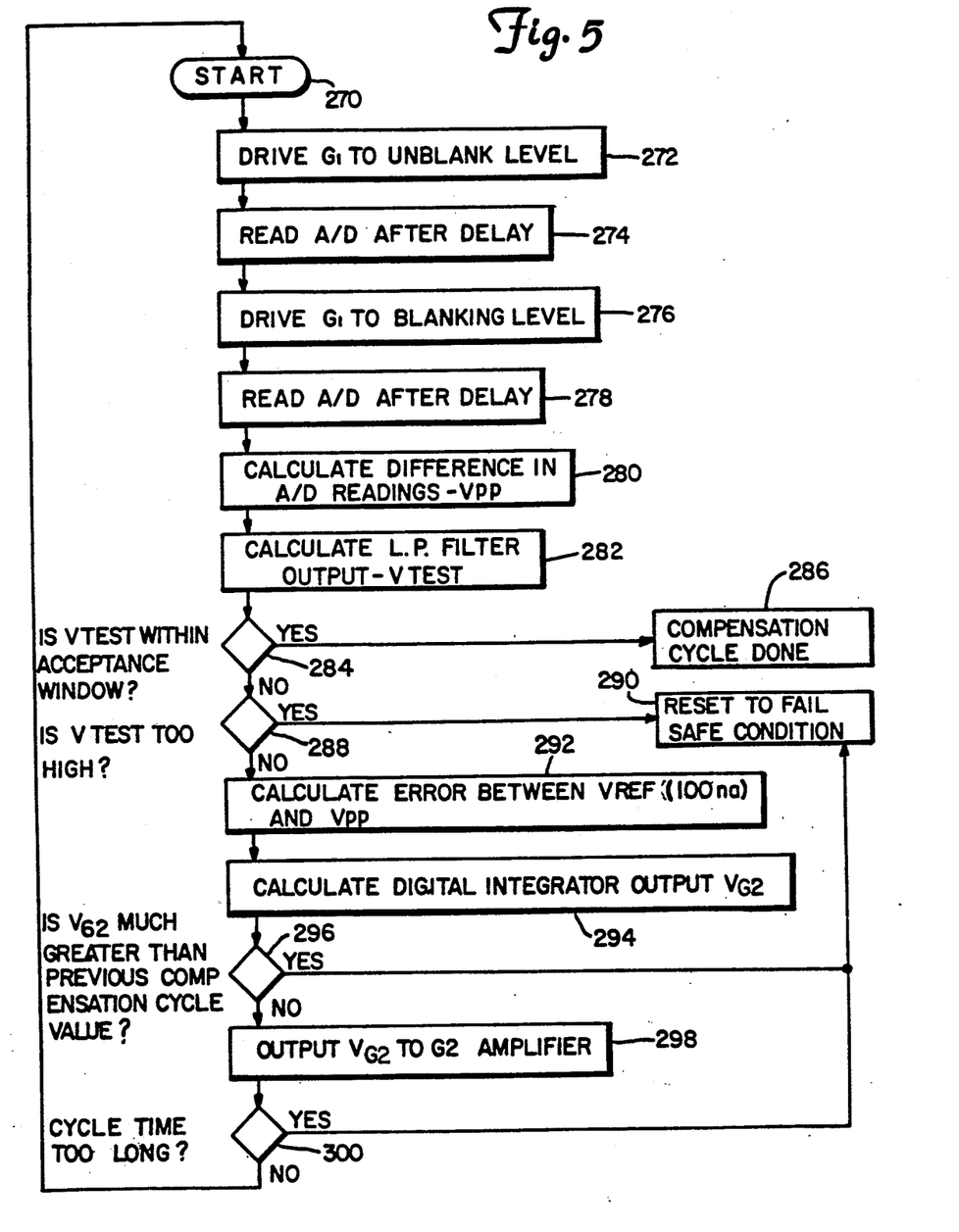
FIG. 5 is a flow diagram for the operation of the present invention.

The flow diagram for the process is seen in FIG. 5. When the calibration process is started as shown by box 270, at the beginning of each cycle of copying, the first step is shown by box 272 to be driving the bias on $G_1$ to the unblanked level. Next, after a small delay to remove transients, the output of the analog-to-digital converter, i.e., A/D 220 in FIG. 4, is read in the step 2 box 274 by means such as the peak-to-peak device 232 in FIG. 4. Then in the Step 3 box 276, $G_1$ is driven to the blanking level and in step 4, the A/D output is read as in box 278, again after a delay to remove transients. The difference between the two outputs is the peak-to-peak voltage $V_{pp}$ and is determined in step 5, as shown in box 280, which may be the P/P detector 232 in FIG. 4. This voltage is filtered in step 6, as shown by box 282, to create the test voltage $V_{TEST}$ and this voltage is then compared with the $V_{REF}$ voltage as was explained in connection with FIG. 4. If the question "Is $V_{TEST}$ within the acceptance window" (or percentage of $V_{REF}$ which is desired) in box 284 is answered "yes", then the compensation cycle is complete as is shown in box 286. If the answer is "no" then the system checks to see if the voltage $V_{TEST}$ is too high at box 288. The purpose of this step is to protect the system if some part has failed and the peak-to-peak voltage grows to a value beyond that which would be expected from the last time it was checked. Too high a voltage could cause damage to the CRT. If in fact $V_{TEST}$ is too high, then the system goes to a box 290 which resets the system for fail safe operation and no further action takes place until the system is checked by an operator and corrected. If $V_{TEST}$ is not too high, then at box 292 the error between $V_{REF}$ and $V_{pp}$ is checked. This step corresponds to that performed by summing circuit 174 in FIG. 4. The compensation then continues by calculating the output of the digital integrator $V_{G2}$ as at box 294 which is like the output of DI from box 180 in FIG. 4. Next, a check is made at box 296 by asking the question "Is $V_{G2}$ much greater than previous compensation cycle value." The purpose of this step is again to protect the equipment, since too high a $V_{G2}$ could produce damage to the CRT. As with the $V_{TEST}$ box 88, an affirmative answer to this question results in a reset and fail safe return to box 290.

If the $V_{G2}$ voltage is not too high, then at box 298 the output $V_{G2}$ is applied to the second gate such, as gate 76 in FIG. 3, and compensation continues. As a final safety check, the question "Is the cycle time too long?" is asked at box 300. The reason for this is that if the cycle takes more than a predetermined amount of time, another possible malfunction may have occurred. Accordingly, if "yes" is the answer, the system reverts to reset and fail safe box 290. On the other hand, if the answer is "no", then the compensation again continues by reverting back to the start box 270.

It is seen that the system so far described provides a compensation for drift in an economical and simple manner using the heretofore unused second grid for assuring a continued level of brightness.

The values for the components used in connection with the invention thus far described are as follows:

R86 = 10K Ohms
C94 = 2200 Pico Farads
C96 = 2200 Pico Farads
R102 = 1MOhm
R104 = 1MOhm MC 124 may be a general purpose computer such as an Intel 8286 based microcomputer.

Control Regulator 128 is a 74LS273 of Texas Instruments.

Amplifiers 160 and 136 are closed loop, discrete high voltage amplifiers using an operational amplifier and high voltage transistors.

Amplifier 132 is a high bandwidth, closed loop amplifier using an 824J operational amplifier of Analog Devices Inc. and a TRW CR2424 video amplifier Amplifier 110 is an AMP-01F of Precision Monolithics Inc.

D/A converter 158 is an AD7541 of Analog Devices Inc.

D/A converter 150 is BT104K of Brooktree Inc. and

A/D converter 120 is an ADC 670J from Analog Device Inc.

While the invention as described in connection with FIGS. 1 through 5 is a preferred embodiment, there are other possible embodiments which should be considered within the scope of the present invention. Examples are seen in FIGS. 6, 7 and 8.

Figure 6:
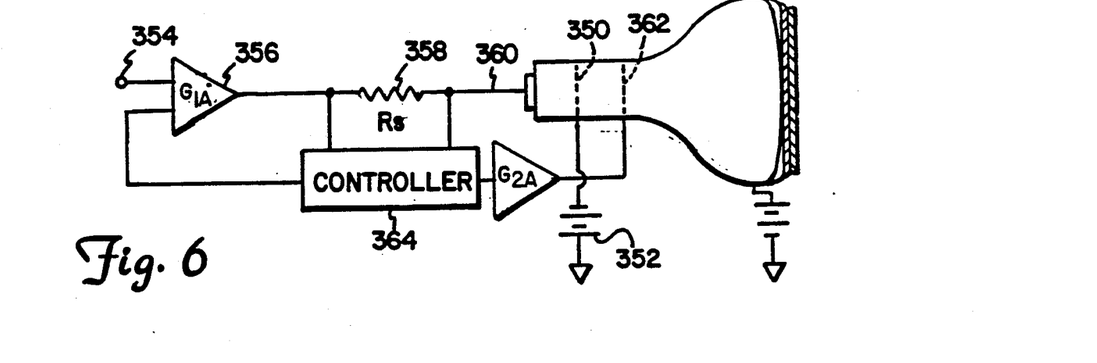
FIG. 6 is a schematic diagram of another embodiment of the present invention.

In FIG. 6, a system similar to that shown in FIG. 1 is shown except that the pixel input and fixed bias to the first grid and cathode, respectively, are reversed. In FIG. 6, the first grid 350 is connected to a source of fixed bias 352 and the variable pixel signal to produce the image to be copied is presented to an input 354 connected to pixel amplifier 356 whose output is connected through sensing resistor 358 to the cathode 360. Otherwise the compensation remains the same by controlling the bias to the second grid 362 from controller 364 which may be like that described in connection with FIG. 3.

Figure 7:
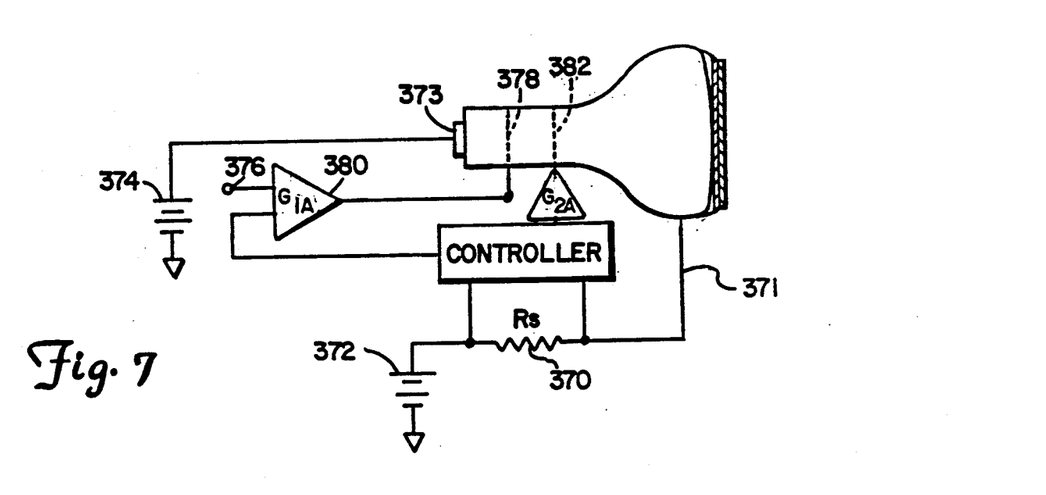
FIG. 7 is a schematic diagram of still another embodiment of the present invention.

In FIG. 7, a system similar to FIG. 1 is shown except that the current indicative of brightness is produced across a sensing resistor 370 attached between the anode 371 of the CRT and the anode bias source 372. The cathode 373 is again connected to a source of fixed potential at 374, the pixel input 376 is again connected to the first grid 378 through the pixel amplifier 380 like in FIG. 1 but these two connections could be reversed as in FIG. 6. The compensation is again provided by controlling the bias to the second grid 382 with a controller which may be like that described in connection with FIG. 3.

Figure 8:
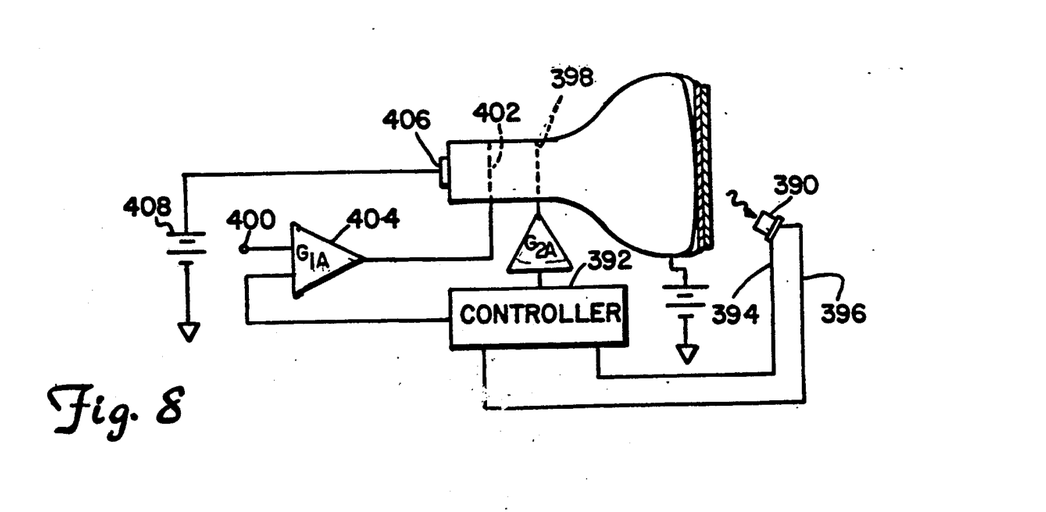
FIG. 8 is a schematic diagram of yet another embodiment of the present invention.

In FIG. 8, a system similar to FIG. 1 is shown but now the brightness is sensed by a photo sensor 390 set to view the output from the face of the CRT. The brightness controls the input to the controller 392, in a manner similar to the input from the sensing resistor $R_S$ in FIG. 1, via leads 394 and 396 and again the bias to the second grid 398 is controlled to assure consistent brightness. The pixel input 400 is again connected to the first grid 402 through pixel amplifier 404 and the cathode 406 is again connected to a source of fixed potential 408 as these elements were connected in FIG. 7, but again they could be reversed.

Although the present invention has been described with reference to preferred embodiments, workers skilled in the art will recognize that changes may be made in form and detail without departing from the spirit and scope of the invention.

What is claimed is:

1. Drift compensating means for controlling the brightness of an image produced by a cathode ray tube having an anode, a cathode, a first grid and a second grid, comprising:
    first means connecting the cathode to a source of first potential;
    second means connecting the first grid to a source of second potential; and
    sensing means having an output indicative of the brightness of the image connected to the second grid to apply a voltage thereto, changes of brightness due to drift are sensed by the sensing means to produce changes in the output, which changes operate to produce changes in the voltage applied to the second grid so as to change the brightness to compensate for drift.

2. Apparatus according to claim 1 wherein the sensing means comprises current sensing means to sense the current flowing in the cathode.

3. Apparatus according to claim 1 wherein the sensing means comprises current sensing means to sense the current flowing in the anode.

4. Apparatus according to claim 1 wherein the sensing means includes radiation responsive means responsive to radiation from the image.

5. Apparatus according to claim 2 wherein the current sensing means includes an impedance connected in the current path of the cathode and the voltage across the impedance is sensed.

6. Apparatus according to claim 3 wherein the anode is connected in circuit with an impedance and a source of third potential and the voltage across the impedance is sensed.

7. Apparatus according to claim 5 wherein the output is compared to a reference and the result of the comparison is used to adjust the voltage applied to the second grid.

8. Apparatus according to claim 2 further including means to modulate the voltage applied to one of the first grid and cathode so that the current flowing in the current sensing means has an alternating component.

9. Apparatus according to claim 8 wherein the current sensing means includes capacitive means to pass only the alternating component to the output.

10. Apparatus according to claim 9 further including means to determine the peak to peak value of the alternating output and including means to compare the peak to peak value with a reference value.

11. Apparatus according to claim 10 further including means to digitize the output and to compare the digitized output to a digitized reference to produce a digital difference signal and including means to convert the digital difference signal to an analog signal for changing the potential applied to the second grid.

12. Apparatus according to claim 1 wherein the cathode ray tube has image producing and non-image producing periods and wherein the sensing means includes means for changing the voltage applied to the second grid during a non-image producing period until a predetermined brightness is obtained and thereafter holding the voltage on the second grid during an image producing period.

13. Apparatus according to claim 12 wherein the predetermined brightness is a value slightly above cutoff.

14. Apparatus according to claim 2 wherein the cathode ray tube has image producing and non-image producing periods and wherein the sensing means includes means for changing the voltage applied to the second grid during a non-image producing period until a predetermined current is sensed and thereafter holding the voltage on the second grid during an image producing period.

15. Apparatus according to claim 14 wherein the predetermined current is a value slightly above cutoff.

16. Apparatus according to claim 12 wherein, while an image is being produced, one of the first and second potentials is a predetermined fixed value, while the other of the first and second potentials is variable to produce the image.

17. Apparatus according to claim 16 wherein the predetermined brightness is a value slightly above cutoff.

18. Apparatus according to claim 17 including further means operable during the non-image producing period to cause the potential applied to one of the first grid and cathode to alternate from a value below that necessary to produce cutoff to a value slightly above that necessary to produce cutoff.

19. Apparatus according to claim 18 wherein the further means causes the voltage applied to the second grid to be first lowered to a value necessary to assure that the brightness will be below cutoff and thereafter, the voltage applied to the second grid to be increased until the predetermined brightness is sensed.

20. Apparatus according to claim 14 wherein, during an image producing period, one of the first and second potentials is a predetermined fixed value, and the other of the first and second potentials is variable to produce the image.

21. Apparatus according to claim 20 wherein the predetermined current is a value slightly above cutoff.

22. Apparatus according to claim 21 including further means operable during an non-image producing period to cause the potential applied to one of the first grid and cathode to alternate from a value below that necessary to produce cutoff to a value slightly above that necessary to produce cutoff.

23. Apparatus according to claim 22 wherein the further means operates to cause the; voltage applied to the second grid to be first lowered to a value necessary to assure that the current will be below cutoff and thereafter, the voltage applied to the second grid to be increased until the predetermined current is sensed.

24. The method of adjusting the brightness of the image produced by a CRT which has an anode, cathode, first grid and second grid comprising the steps of:
A) monitoring the brightness of the image to produce an output signal indicative thereof;
B) comparing the output signal with a reference signal to produce a resultant signal; and
C) changing the voltage on the second grid in accordance with the resultant signal to adjust the brightness of the image.

25. The method of claim 24 wherein step A includes:
A1) monitoring the current in the cathode.

26. The method of claim 25 wherein step A further includes:
A2) modulating the current in the cathode and monitoring the modulated portion of the current.

27. The method of claim 26 wherein step B includes:
B1) obtaining a signal representing the peak to peak value of the modulated portion.

28. The method of claim 27 wherein the signal is compared with a reference to produce a resultant.

29. The method of claim 28 wherein steps B and C include, respectively:
B2) digitizing the peak to peak value and comparing it to a digitized reference to produce a digital resultant, and
C1) Changing the digital resultant to an analog signal and adjusting the voltage on the second grid in accordance with the analog signal.

30. The method of claim 29 wherein the method is performed during a calibration period when the image process is inactive.

31. The method of claim 30 wherein the calibration period includes the steps of:
D) applying a fixed voltage to one of the cathode and first grid;
E) applying a modulated voltage to the other of the first grid and cathode;
F) reducing the voltage on the second grid to a point where there is no current in the cathode; and
G) raising the voltage on the second grid until the current in the cathode reaches a predetermined value.

32. The method of claim 24 wherein step A includes:
A1) monitoring the current in the anode.

33. The method of claim 24 wherein step A includes:
A1) monitoring the brightness of the image with a radiation responsive device.

34. Apparatus for controlling the brightness of an image produced by a CRT having an anode, a cathode, a first grid to receive a pixel input and a second grid, comprising:
control means having an input and a first output;
impedance means connected in circuit with the first output of the control means and the cathode;
computer means having an input, having a first output connected to the first grid to supply the pixel input thereto, having a second output connected to the second grid to supply a calibration signal thereto and having a third output connected to the input of the control means; and
current sensing means connected to the impedance means to sense the current flowing therethrough and having an output connected to the input of the computer means, changes in current from a predetermined reference value being detected by the computer means to change the second output of the computer means so as to change the voltage on the second grid to adjust the current through the impedance means until the predetermined reference value is reestablished thereby controlling the brightness of the image.

35. Apparatus according to claim 34 wherein the control means includes a second output and means connecting the second output of the control means to the first grid to supply blanking and unblanking signals thereto so as to produce an alternating current component in the impedance and the current sensing means includes means to isolate the alternating component as an indication of the current in the impedance means.

36. Apparatus according to claim 35 wherein, prior to supplying the first output of the computer means to the first grid to allow the CRT to produce an image, the blanking signal is of such value as to drive the CRT to beyond cutoff and the unblanking signal is of such value as to drive the CRT to just above cutoff and the second output of the computer means is initially of such value as to assure no current in the impedance means and thereafter is increased to a value which is substantially equal to the reference value.

37. The method of calibrating the brightness of the image produced by a CRT having an anode, a cathode, a first grid and second grid comprising the steps of:
A) Driving the voltage on the first grid to an unblanked level;
B) Producing a first output of value indicative of the current in the cathode;
C) Driving the first grid to a blanking level;
D) Producing a second output of value indicative of the current in the cathode;

E) Calculating the difference between the first and second outputs;
F) Comparing the difference with a reference value to produce a third output;
G) Changing the voltage on the second grid in a direction to cause a reduction in the third output; and
H) Repeating Steps A) to G) until the third output is less than a predetermined value.

38. The method of claim 37 including the step of:
D1) checking the magnitude of the second output and if larger than a reference value, stopping the operation of the CRT.

39. The method of claim 38 including the step of:
F1) checking the magnitude of the third output and if larger than the previous value by an amount greater than a reference amount, stopping the operation of the CRT.

40. The method of claim 29 including the step of:
G1) checking the length of time steps A) to G) have taken and if greater than a reference value, stopping the operation of the CRT.

* * * * *